(No Model.) 2 Sheets—Sheet 1.

G. D. BURTON.
STOCK CAR.

No. 376,729. Patented Jan. 24, 1888.

WITNESSES.
L. Brunehan.
Geo. D. David

INVENTOR.
Gus. D. Burton
Chas E. Barber Atty.

(No Model.) 2 Sheets—Sheet 2.
G. D. BURTON.
STOCK CAR.
No. 376,729. Patented Jan. 24, 1888.
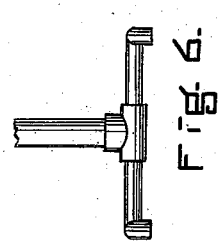
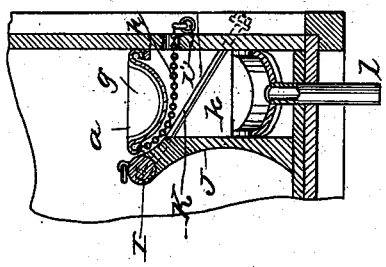
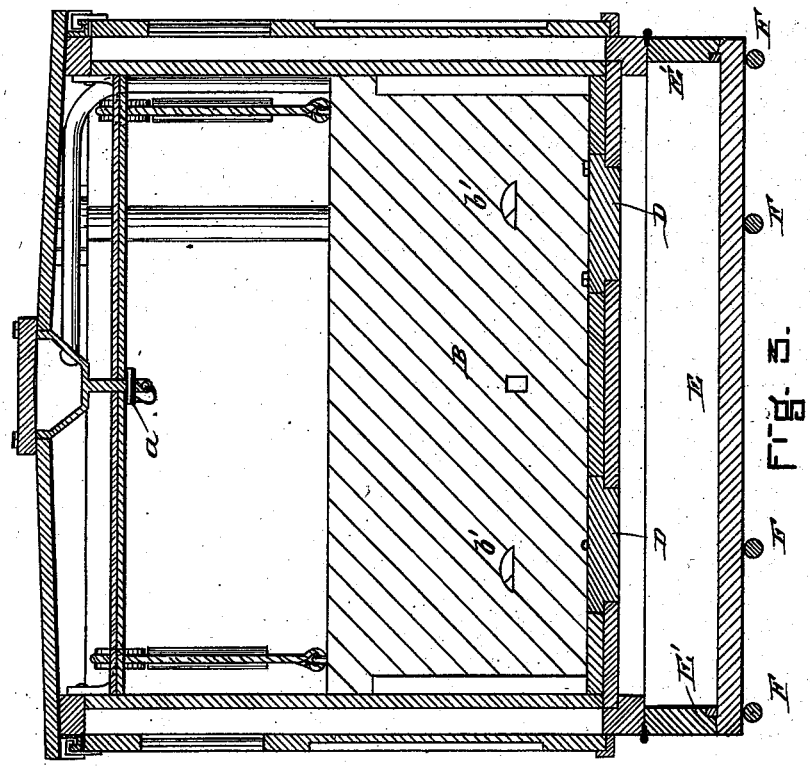
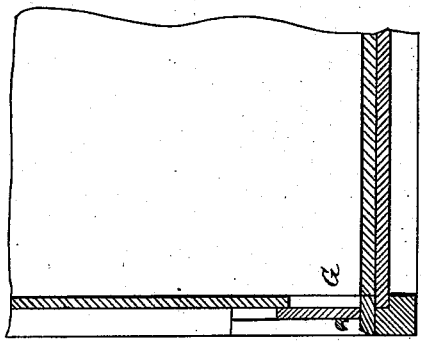
WITNESSES.
*L. Brennan.*
*Geo. D. Davis*
INVENTOR.
*Geo. D. Burton*
*Chas. E. Barber, Atty.*
N. PETERS, Photo-Lithographer, Washington, D. C.

UNITED STATES PATENT OFFICE.

GEORGE D. BURTON, OF NEW IPSWICH, NEW HAMPSHIRE.

STOCK-CAR.

SPECIFICATION forming part of Letters Patent No. 376,729, dated January 24, 1888.

Application filed September 23, 1886. Serial No. 214,337. (No model.)

*To all whom it may concern:*

Be it known that I, GEORGE D. BURTON, a citizen of the United States, residing at New Ipswich, in the county of Hillsborough and State of New Hampshire, have invented a new and useful Improvement in Stock-Cars, of which the following is such a full, clear, and exact description of a preferred form as will enable others skilled in the art to which my invention appertains to make and use the same, reference being had to the accompanying drawings.

Figure 1:
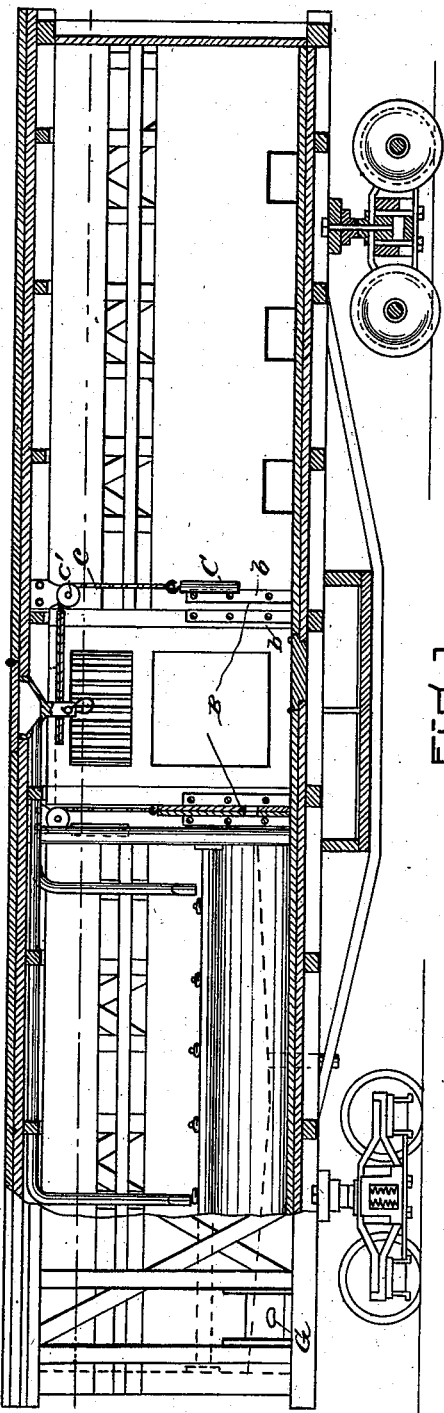
Figure 2:
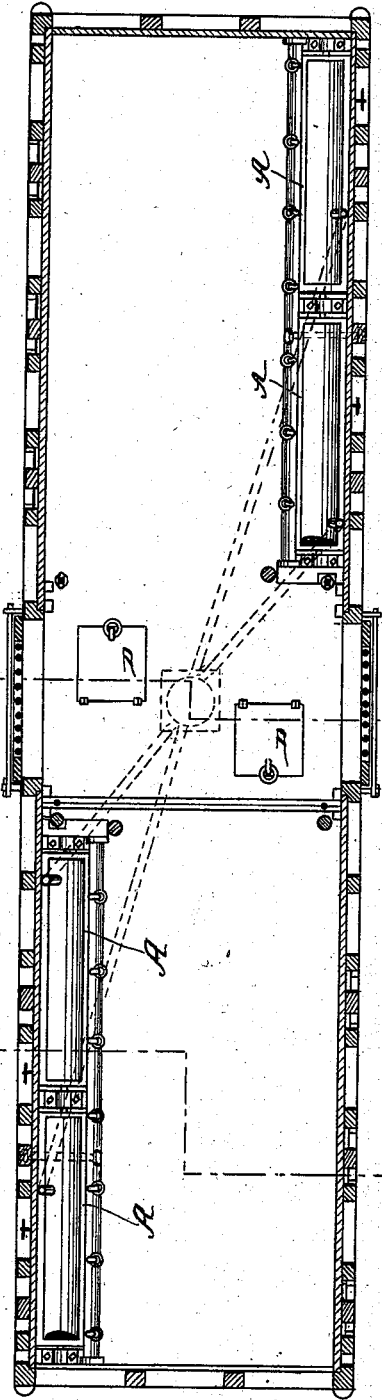

Figure 1 is a side elevation, partly in section, of my improved car, showing the novel features of my invention. Fig. 2 is a top plan view of the car, showing the general plan of the interior of the latter. Fig. 3 is a transverse vertical section of the car, taken on the line $y\ y$ of Fig. 2. Fig. 4 is a detail view of a door at the end, which is designed to slide up to facilitate the cleaning out of the car. Fig. 5 is a detail view of the manger-trough, showing the general construction of this section of the car. Fig. 6 is a detail view of the water-pipe for the double trough.

The object of my invention is to construct a car the interior space of which may be utilized as a stock-car when it is desired to carry live stock, and at the same time to construct a car which may be readily and easily converted into a freight-car for carrying long timbers, railroad-iron, and other coarse freight, or, in fact, any kind of freight which it may be desired to carry on the return trips.

Another object of my invention is to construct a stock-car in which the animals may be fed and watered in transit without stopping the car to allow the attendant to get at the hay or other feed which may be carried for the stock.

Still another object of my invention is to provide a means for facilitating the ready and effectual cleansing of the car when it is desired to clean it out.

With these general objects in view I construct the body of the car with troughs A A, which extend in pairs longitudinally along the car diagonally opposite each other, thus causing one half the stock to stand with their heads one way, while the other half of the stock stand with their heads in an opposite direction to equalize the weight in the car. At each of the inner ends of these troughs or mangers I construct partitions B, which are designed to slide up and down within the guides $b\ b$ in the sides of the car. Each of the sliding doors B is provided with a suitable weight, C, and a cord, $c$, which works over pulleys $c'$. These partitions are designed to slide up out of the way when the car is converted into a freight-car, and are held in position by a pin, $a$, as is clearly shown in Fig. 3. Each of the partitions B is provided with hand-holes $b'\ b'$. When the partitions are down, as shown in Fig. 1, the central portion of the car is converted into a small room, which is designed for the attendant.

In the floor of the car and between the partitions B when down, I make two trap-doors, D D, which open upward, or which may be constructed to open downward, if found desirable, into the feed-compartment E beneath the car. The feed-compartment is provided at each side with doors E' E', and the bottom of this feed-compartment or feed-bin is supported by the truss-rods F F.

G designates a little door, which is to slide up and down to facilitate the cleaning out of the car.

By reference to Fig. 5 it will be observed that the troughs, which are pivoted at $g$, are designed to tilt, and are operated by the chain $h$ and the ring $i$. When it is desired to empty a trough, the ring $i$ is pulled and the trough is tipped over and its contents dropped into the gutter $k$. As soon as the strain on the ring $i$ is released the trough will instantly resume its normal position, as shown in Fig. 5. The gutter $k$ is provided with an outlet, $l$, at its lower outer portion. The double water-pipe (shown in Fig. 6) is designed to be used when the troughs come close together and when the troughs are divided into two sections, as shown in Fig. 2. It is quite apparent, however, that these troughs may be made longer and extend the entire length of one-half the car without departing from the spirit of my invention.

The manger is constructed with the bar I and the semicircular wall J, which is concave on its outside to prevent the animals from injuring their knees. The front of the manger and the beam are held in place by a diagonal rod, K, which is secured to the timbers of the car at the end opposite the end which passes through the front of the manger.

It is quite apparent that the folding partitions B may be made of slats and flexible connecting material to roll up vertically; or they may be made to roll around a vertical post, which may be located at a point either side of the car, preferably near the space now occupied by the vertical guides $b$ $b$; and, in fact, various other equivalent means of folding or rolling up the partitions may be employed to advantage without departing from the general spirit of my invention. It is also quite apparent that the partitions may be made in a single piece, and may be moved out of place and set up against the end of the car when it is desired to convert it into a freight-car; or the floor itself may be made in sections, and made with suitable hinges or pivotal connections to fold up and form a central apartment; or the vertical partitions might be hinged in the center, to be folded up and set aside when not required to form the room for the attendant when the car is used as a stock-car.

It will be observed that the water-tank has a projection at the bottom which is perforated. This perforation serves as a means of locking the folding partitions up out of the way by inserting a pin through such perforation after the doors have been put in place in the top of the car.

Having now described a preferred form of carrying out my invention, what I desire to secure by Letters Patent, and what I therefore claim, is—

1. In a stock-car, the combination of the manger provided with the diagonal rod K, which extends from the front portion of the manger between the feed-trough and a gutter for the feed-trough, and holds the manger in position, substantially as and for the purposes specified.

2. In a stock-car, the main body provided with vertical grooves each side of its central portion and having a water-tank at its top, which water-tank is provided with a perforated projection, in combination with sliding partitions provided with counterbalancing-weights having cords which extend up to the top of a car and across the space and are adapted to slide up and down on the side opposite that side which the sliding door occupies, said sliding door being perforated, and a pin for securing the door in place when in an elevated folded position, substantially as and for the purposes specified.

In testimony that I claim the above I hereunto set my hand in the presence of two subscribing witnesses.

GEO. D. BURTON.

Witnesses:
  WILLIAM H. NASH,
  CHAS. H. MAGOON.